United States Patent
Nguyen et al.

(10) Patent No.: US 9,595,120 B2
(45) Date of Patent: Mar. 14, 2017

(54) METHOD AND SYSTEM FOR MEDICAL IMAGE SYNTHESIS ACROSS IMAGE DOMAIN OR MODALITY USING ITERATIVE SPARSE REPRESENTATION PROPAGATION

(71) Applicant: Siemens Healthcare GmbH, Erlangen (DE)

(72) Inventors: Hien Nguyen, Princeton, NJ (US); Shaohua Kevin Zhou, Plainsboro, NJ (US)

(73) Assignee: Siemens Healthcare GmbH, Erlangen (DE)

( * ) Notice: Subject to any disclaimer, the term of this patent is extended or adjusted under 35 U.S.C. 154(b) by 0 days.

(21) Appl. No.: 14/696,780

(22) Filed: Apr. 27, 2015

(65) Prior Publication Data

US 2016/0314600 A1    Oct. 27, 2016

(51) Int. Cl.
| | |
|---|---|
| G06K 9/00 | (2006.01) |
| G06T 11/00 | (2006.01) |
| G06T 7/00 | (2006.01) |
| G06T 11/60 | (2006.01) |
| G06K 9/62 | (2006.01) |

(52) U.S. Cl.
CPC .......... *G06T 11/003* (2013.01); *G06K 9/6255* (2013.01); *G06K 9/6256* (2013.01); *G06T 7/0012* (2013.01); *G06T 7/0081* (2013.01); *G06T 11/60* (2013.01); *G06T 2207/10081* (2013.01); *G06T 2207/30016* (2013.01); *G06T 2210/41* (2013.01); *G06T 2211/40* (2013.01)

(58) Field of Classification Search
CPC ... G06T 11/003; G06T 7/0012; G06T 7/0081; G06T 11/60; G06T 2207/10081; G06T 2207/30016; G06T 2210/41; G06T 2211/40; G06K 9/6255; G06K 9/6256
See application file for complete search history.

(56) References Cited

U.S. PATENT DOCUMENTS

| | | | |
|---|---|---|---|
| 8,235,726 B2 | 8/2012 | Hostettler et al. | |
| 8,241,041 B2 | 8/2012 | Hostettler et al. | |
| 8,761,471 B2 | 6/2014 | Ozawa et al. | |
| 2005/0033157 A1* | 2/2005 | Klein | A61B 90/39 600/411 |
| 2008/0037851 A1 | 2/2008 | Takayama | |
| 2008/0312884 A1 | 12/2008 | Hostettler et al. | |
| 2009/0046912 A1 | 2/2009 | Hostettler et al. | |
| 2009/0069672 A1* | 3/2009 | Pfister | A61B 6/4464 600/424 |
| 2010/0040285 A1* | 2/2010 | Csurka | G06K 9/00624 382/170 |
| 2010/0046829 A1* | 2/2010 | Mahajan | G06K 9/40 382/159 |

(Continued)

*Primary Examiner* — Amara Abdi

(57) ABSTRACT

A method and apparatus for medical image synthesis across image modalities or domains is disclosed, which synthesizes a target medical image based on a source medical image. A plurality of image patches are cropped from the source medical image. A synthesized target medical image is then generated from the source medical image by jointly performing sparse coding between each image patch of the source medical image and a corresponding image patch of the synthesized target image based on jointly trained source and target dictionaries.

37 Claims, 6 Drawing Sheets

(56) References Cited

U.S. PATENT DOCUMENTS

2011/0222781 A1* 9/2011 Nguyen ............... G06K 9/6244
382/218
2012/0148139 A1 6/2012 Ozawa et al.
2013/0035583 A1 2/2013 Park et al.
2013/0259336 A1 10/2013 Wakai
2013/0342668 A1 12/2013 Kasumi et al.

* cited by examiner

METHOD AND SYSTEM FOR MEDICAL IMAGE SYNTHESIS ACROSS IMAGE DOMAIN OR MODALITY USING ITERATIVE SPARSE REPRESENTATION PROPAGATION

BACKGROUND OF THE INVENTION

The present invention relates to data synthesize medical image data, and more particularly, to synthesizing medical image data across image domains or image modalities.

In many practical medical image analysis problems, a situation is often encountered in which medical image data available for training, for example for machine learning based anatomical object detection, has a different distribution or representation than the medical image data given during testing. The difference is typically due to modality heterogeneity or domain variation. For example, a magnetic resonance (MR) image is different from a computed tomography (CT) image for the same patient, MR images are different across different protocols, contrast CT images are different from non-contrast CT images, and CT images captured with low kV are different from CT images captured with high kV.

The discrepancy between training and testing data is an important factor that leads to poor performance of many medical image analysis algorithms, such as anatomical object detection and segmentation algorithms. Accordingly, a mechanism for intelligently adapting medical analysis image systems to new modalities or domains of medical image data without having to spend the effort to collect a large number of new data samples is desirable.

BRIEF SUMMARY OF THE INVENTION

The present invention provides a method and system for synthesizing medical images across image domain or modality using iterative sparse representation propagation. Embodiments of the present invention solve the aforementioned challenges by synthesizing target medical images from medical images in a source domain by exploiting correlations between the source and target domains. Embodiments of the present invention provide a generalized and robust framework for cross-modality or cross-domain medical image synthesis. The newly synthesized medical images can be used for training, for example for machine learning classifiers, and can lead to improvements in anatomical object detection, segmentation, or classification by medical image analysis systems. In addition, the ability to generate the target images across modalities or domains without actually performing image acquisition on a number of patients to collect the target images is beneficial not only for anatomical object detection and classification tasks, but also for many other possible applications. For example, embodiments of the present invention can be used to synthesize medical images in order to create visualization tools for virtual domains, to perform cross-modality registrations, or to up-sample the resolution of medical image data.

In one embodiment of the present invention, a plurality of image patches are cropped from a source medical image. A synthesized target medical image is generated from the source medical image by jointly performing sparse coding between each image patch of the source medical image and a corresponding image patch of the synthesized target image based on jointly trained source and target dictionaries.

These and other advantages of the invention will be apparent to those of ordinary skill in the art by reference to the following detailed description and the accompanying drawings.

DETAILED DESCRIPTION

The present invention relates to a method and system for medical image synthesis across image domain or modality using iterative sparse representation propagation. Embodiments of the present invention are described herein to give a visual understanding of the medical image synthesis method. A digital image is often composed of digital representations of one or more objects (or shapes). The digital representation of an object is often described herein in terms of identifying and manipulating the objects. Such manipulations are virtual manipulations accomplished in the memory or other circuitry/hardware of a computer system. Accordingly, is to be understood that embodiments of the present invention may be performed within a computer system using data stored within the computer system.

Figure 1:
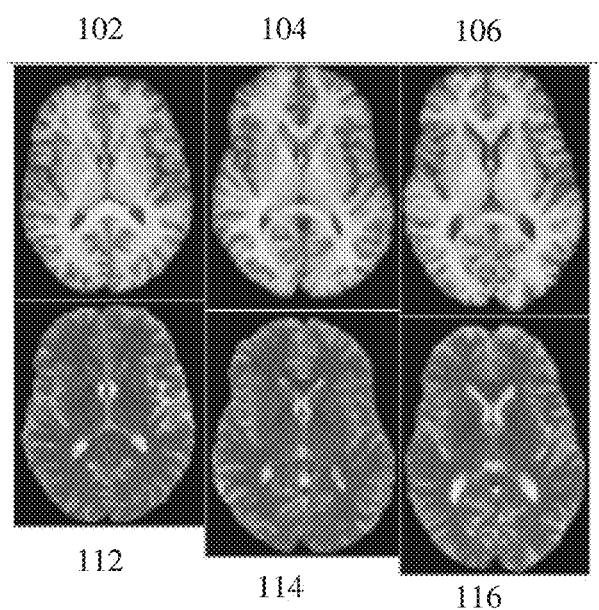
FIG. 1 illustrates examples of T1 magnetic resonance (MR) images and T2 MR images.

Embodiments of the present invention provide a generalized and robust framework for cross-modality or cross-domain medical image synthesis. Embodiments of the present invention can be used to synthesize target medical images from available images in a source domain in order to create large training set of target medical image for training machine learning based classifiers for anatomical object detection, segmentation, tracking, and classification, without having to perform additional image acquisition on a large number of subjects. In addition, embodiments of the present invention may be used to synthesize target medical images for other applications, such as to create visualization tools for virtual domains, to perform cross-modality registration, or to up-sample the resolution of image data. Embodiments of the present invention can be applied to synthesize images across imaging modalities, such as synthesizing a CT image from an MR image, to synthesize images across an image domain, such MR images with different protocols (e.g., T1 and T2), contrast CT images and non-contrast CT images, CT image captured with low kV and CT images captured with high kV, or any type of low resolution medical image to a corresponding high resolution medical image. It is to be understood that the present invention is not limited to these examples and may be performed to synthesize any type of target image from any type of source image. In an exemplary embodiment, given a T1 MR image, the method described herein can be used to synthesize the corresponding T2 MR image. FIG. 1 illustrates examples of T1 MR images and T2 MR images. In particular, FIG. 1 shows T1 MR images 102, 104, and 106 and corresponding T2 MR images 112, 114, and 116, respectively. The absolute correlation between one random image from T1 and another random image from T2 is 0.17±0.15. As a result, linear regression will likely generate inferior results as comparer to the method described herein.

Sparse representation is a powerful model for image processing. Sparse representation models a signal as a linear combination of a small number of bases, also known as dictionary atoms:

$$x = D\alpha, \text{ where } \|\alpha\|_0 \leq T_0.$$

Here, x is the signal, D is the dictionary whose columns are dictionary atoms, $\alpha$ is the sparse coefficient, and $\|\alpha\|_0$ is the number of non-zero elements which is constrained to be less than or equal to $T_0$, which is a predetermined threshold value. This representation can be regarded as a union of subspaces. The dictionary is typically not known a priori. In a possible implementation, D can be picked to be different types of wavelets. However, in an advantageous implementation, D can be learned (trained) using dictionary learning algorithms like K-SVD or method of orthogonal direction (MOD), which yields more compact sparse representations and leads to better performances in many tasks. Given a signal corrupted by different types of noise and a learned dictionary in which the signal can be sparsely represented, the original signal can be recovered using sparse coding techniques as follows:

$$\alpha^* = \operatorname{argmin}_\alpha \|x - D\alpha\|_2, \text{ where } \|\alpha\|_0 \leq T_0, \quad (1)$$

wherein the recovered signal is reconstructed from the learned dictionary as $D\alpha^*$. In practice, sparse coding has been shown to perform well and yield superior reconstruction and noise reduction performance. This is due to the fact that random noises and artifacts are rarely sparse in the dictionary, which was learned to optimally represent the signal of interest.

Figure 2:
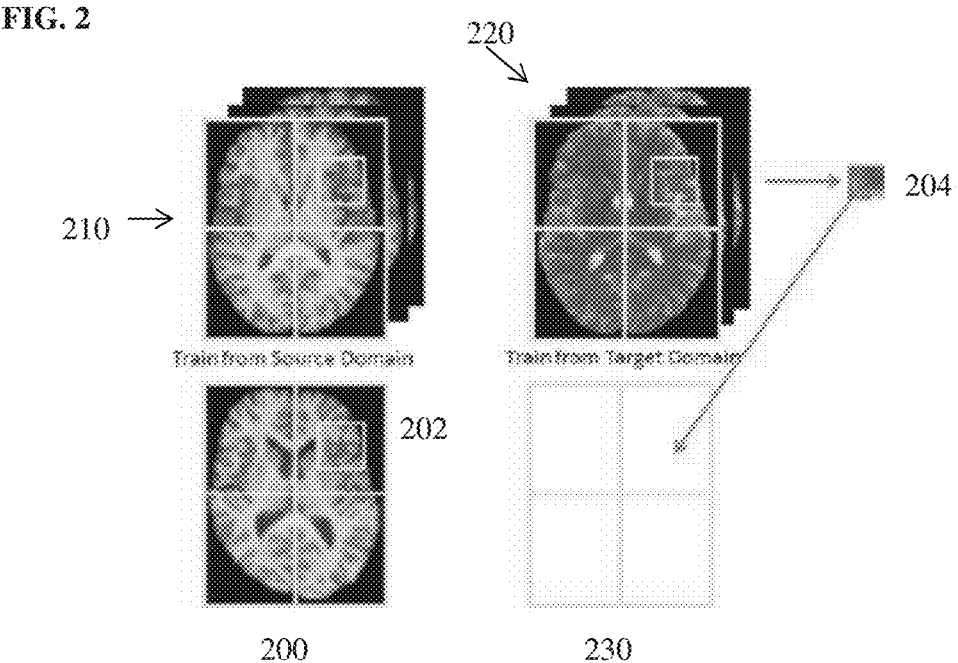
FIG. 2 illustrates an overview of a medical image synthesis framework according to an embodiment of the present invention.

According to an advantageous aspect of the present invention, embodiments of the present invention utilize sparse representation to learn an implicit transformation that transforms medical image data from a source domain to a target domain. FIG. 2 illustrates an overview of the medical image synthesis framework according to an embodiment of the present invention. As shown in FIG. 2, a source dictionary 210 is trained from a source domain and a target dictionary 220 is trained from a target domain. In particular, the source dictionary 210 is trained based on a database of image patches extracted from source medical images and the target dictionary 220 is trained from a database of corresponding image patches extracted from target medical images. In the example of FIG. 2, the source medical images are T1 MR images and the target medical images are T2 MR images, but the present invention is not limited thereto. As shown in FIG. 2, for each image patch 202 of an input source medical image 200, an optimal sparse coefficient is determined based on the both the trained source dictionary 210 and the trained target dictionary 220, and the optimal sparse coefficient is used to reconstruct a corresponding image patch 204 for a synthesized target image 230.

Figure 3:
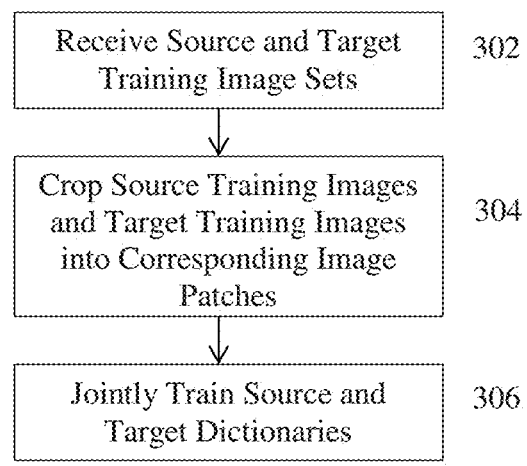
FIG. 3 illustrates a method of jointly training source and target dictionaries for sparse representation of a transformation from a source to a target domain according to an embodiment of the present invention.

FIG. 3 illustrates a method of jointly training source and target dictionaries for sparse representation of a transformation from a source to a target domain according to an embodiment of the present invention. At step 302, source and target training image sets are received. The source and target training images can be any type of medical image data, with each source medical image having a corresponding target medical image. For example, the source and target medical images can be medical images of different image modalities (e.g., MR and CT images) or images of the same modality having different image domains (e.g., T1 and T2 MR images, non-contrast and contrast CT images, low-kV and high-kV CT images, etc.). The training images for the source and target domains can be acquired using one or more image acquisition devices, such as an MR scanner, CT scanner, ultrasound scanner, etc., and stored in one or more databases. At step 304, each of the source training images and the target training images is cropped into multiple image patches. Each of the image patches can be a predetermined size. For example, the size of the image patch can be 5×5 pixels, but the present invention is not limited thereto. This results in a database of corresponded image patches in the source and target domains for learning an implicit transformation between the source domain and the target domain.

At step 306, the source and target dictionaries are jointly trained to learn an implicit transformation between the source domain and the target domain. In particular, the source and target dictionaries are trained to jointly optimize the sparse representations of both the source and target domains so that a pair of image patches in corresponding shares the same sparse code:

$$\min_{D_s, D_t, \Gamma} \|P_s - D_s\Gamma\|_F^2 + \beta\|P_t - D_t\Gamma\|_F^2 \quad (2)$$

$$\text{s.t. } \|\Gamma_j\|_0 \leq C, \forall j \in \{1, \ldots, N\},$$

where $P_s$ is the training set of image patches in the source domain, $P_t$ is the training set of image patches in the target domain, $D_s$ is the source domain dictionary, $D_t$ is the target domain dictionary, $\Gamma$ the set of sparse coefficients corresponding to the N training samples in $P_s$ and $P_t$, $\beta$ is a weighting coefficient that weights the target domain relative to the source domain, and C is a constant that determines the maximum number of non-zero elements $\|\Gamma_j\|_0$ in each sparse coefficient. The result of the above optimization is a pair of dictionaries $D_s$ and $D_t$ of the source and target domains. The two dictionaries encode the non-linear correlations between image patches from the two domains. According to an advantageous implementation, the two dictionaries can be trained to satisfy the above optimization problem using dictionary learning algorithms, such as K-SVD or MOD. Once the source and target dictionaries are trained, the trained source and target dictionaries are stored, for example on a memory or storage of a computer system, and can then be used for synthesizing target medical images from source medical images.

Figure 4:
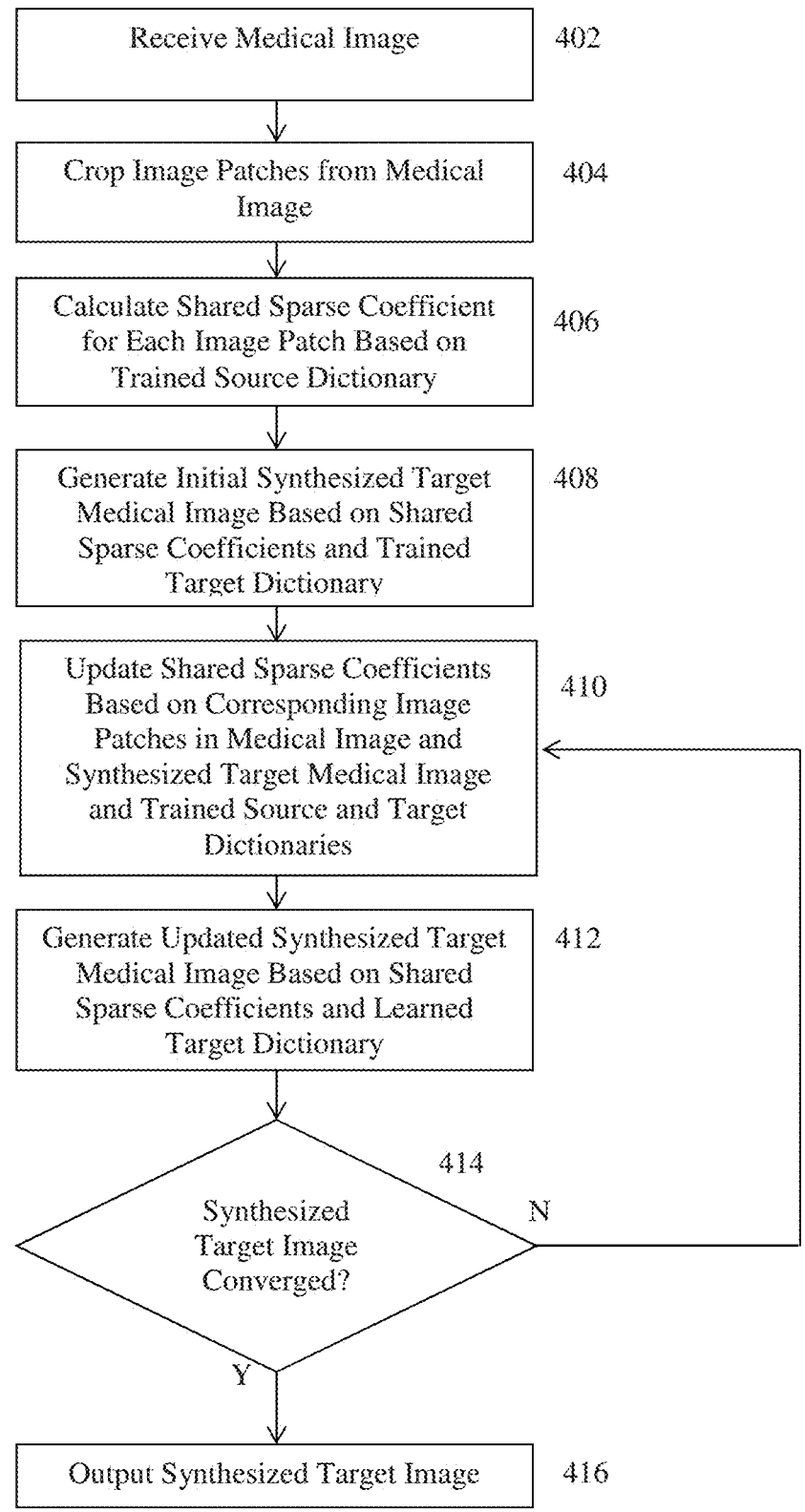
FIG. 4 illustrates a method of synthesizing a target medical image from a source medical image according to an embodiment of the present invention.

FIG. 4 illustrates a method of synthesizing a target medical image from a source medical image according to an embodiment of the present invention. The method of FIG. 4 transforms medical image data of a first image domain or modality to generate a new medical image of a second image domain or modality. The method of FIG. 4 can be used for any type of cross-modality or cross-domain modality medical image synthesis. Some examples of cross-domain image synthesis include synthesizing an MR image of one type of MR protocol (e.g., T2 MR image) from an MR image of another type of MR protocol (e.g., T1 MR image), synthesizing a contrast CT image from a non-contrast MR image, synthesizing a high-kV CT image from a low-kV CT image, and synthesizing a high resolution medical image from a low resolution medical image of the same modality, but the present invention is not limited thereto. Cross-modality image synthesis refers to synthesizing a medical image of one modality (e.g., MR, CT, Ultrasound, PET, DynaCT, etc.) from a medical image of another modality. For example, the method of FIG. 4 can be used to synthesize a CT image from an MR image, or for any other combination of imaging modalities.

At step 402, a medical image is received. This medical image will be considered to be the source image. The medical image can be acquired using any type of imaging modality, such as MR, CT, Ultrasound, X-ray fluoroscopy, DynaCT, positron emission tomography (PET), etc. The medical image can be a 2D or 3D medical image. It is to be understood that although the medical image can be 2D or 3D, we use the term "pixel" herein to refer to elements of the medical image, regardless of the dimensionality of the medical image. In one possible implementation, the medical image can be a previously acquired medical image that is stored on a memory or storage of a computer system, or stored remotely on a server or other network device, and the medical image is received by loading the medical image to a computer system performing the method of FIG. 4. In another possible implementation, the medical image can be received directly from an image acquisition device, such as an MR scanner, CT scanner, etc.

At step 404, image patches are cropped from the medical image. The image patches can be a predetermined size. For example, the image patches can each be 5×5 pixels. In an advantageous implementation, a respective image patch centered at each pixel of the medical image can be cropped or extracted from the medical image. It is also possible that image patches sampled at a subset of pixels of the medical image can be extracted from the medical image.

Steps 406-414 of FIG. 4 generate a synthesized target medical image from the received source medical image by scanning through each patch of the source medical image and performing sparse coding jointly between each image patch of the source medical image and a corresponding image patch of the synthesized target medical image based on the jointly trained source and target dictionaries. In particular, a sparse coefficient is calculated for each image patch as:

$$\hat{\gamma} = \underset{\gamma}{\text{argmin}} \|P_x^S - D_s\gamma\|_F^2 + \beta\|P_x^T - D_t\gamma\|_F^2 \quad (3)$$

$$\text{s.t. } \|\gamma\|_0 \leq C,$$

where $P_x^S$ is an image patch centered a position x in the source medical image, $P_x^T$ is a corresponding image patch centered at the position x in the synthesized target medical image, $D_s$ is the trained source domain dictionary, $D_t$ is the trained target domain dictionary, $\gamma$ the shared sparse coefficient for reconstructing the corresponding source and target image patches in $P_x^S$ and $P_x^T$ from the trained dictionaries, $\beta$ is a weighting coefficient that weights reconstruction of the target image patch relative to the source image patch, and C is a constant that determines the maximum number of non-zero elements $\|\gamma\|_0$ in the sparse coefficient. The appearance of the target image at the current location x is then computed as follows:

$$\hat{P}_x^{(T)} = D_t\hat{\gamma} \quad (4)$$

$$T(x) = \text{center-pixel}(\hat{P}_x^{(T)}). \quad (5)$$

That is, once the optimal shared sparse coefficient $\hat{\gamma}$ is determined for the location x in the corresponding image patches of the source medical image and synthesized target medical image, the full image patch of the synthesized target medical image is reconstructed from the sparse code using the trained target dictionary (Equation (4)), and the pixel value of the center pixel of the reconstructed image patch $\hat{P}_x^{(T)}$ is assigned to the current location x in the synthesized target medical image. The entire target medical image is synthesized by scanning through each location x and repeating the above computations. As described above, the shared sparse coefficient for each image patch is calculated based on corresponding image patches in the source medical image and the synthesized medical image. In the method of FIG. 4, in order synthesize a target medical image from a source medical image, an iterative approach is used to propagate the sparse representation from the source domain in order to determine the shared coefficient jointly based on the source and the target domain. Steps 406-414 of FIG. 4 describe this iterative approach in greater detail.

At step 406, a sparse coefficient is calculated for each image patch of the medical image (source medical image) based on the trained source dictionary. For each image patch of the medical image, the shared sparse coefficient for that image patch and the corresponding image patch of the synthesized target anatomical image is initially calculated based on the image patch of the source medical image and the source dictionary without considering the target domain. In particular, the shared sparse coefficient $\hat{\gamma}$ for each image patch can initially be calculated as:

$$\hat{\gamma} = \underset{\gamma}{\text{argmin}} \|P_x^S - D_s\gamma\|_F^2 \text{ s.t. } \|\gamma\|_0 \leq C. \quad (6)$$

It can be observed that Equation (6) used for the initial computation of the shared sparse coefficient for each image patch of the source medical image and corresponding image patch of the synthesized target medical image is equivalent to Equation (3) with the weighting coefficient $\beta$ set equal to zero. The initial calculation of the sparse coefficient for each image patch, results in the sparse coefficient that best reconstructs the image patch of the source medical image from the trained source dictionary.

At step 408, an initial synthesized target medical image is generated based on the sparse coefficients calculated in step 406 using the trained target dictionary. In particular, for an image patch centered at a current location in the source medical image, a corresponding image patch of the synthesized target medical image is reconstructed from the shared sparse coefficient using the trained target dictionary, as shown in Equation (4). The pixel value of the center pixel in the reconstructed image patch is then assigned to the current location in the synthesized target medical image, as shown in Equation (5). The entire initial synthesized target medical image is generated by performing these operations for all of the image patches extracted from the source medical image in order to assign a pixel value to each pixel in the synthesized target medical image.

At step 410, the shared sparse coefficient for each pair of corresponding image patches in the medical image and the synthesized target medical image is updated based on the corresponding image patches in the medical image and the synthesized target medical image and the trained source and target dictionaries. Once the initial synthesized target medical image is generated, the shared sparse coefficients can be updated by performing the sparse coding jointly for each pair of corresponding image patches in the source and target domain. In particular, a new shared sparse coefficient $\hat{\gamma}$ can be calculated for each pair of corresponding image patches in the source medical image and the synthesized target medical image as $$\hat{\gamma} = \underset{\gamma}{\operatorname{argmin}} \|P_x^S - D_S\gamma\|_F^2 + \beta\|P_x^T - D_T\gamma\|_F^2, \text{ s.t. } \|\gamma\|_0 \leq C,$$

as shown in Equation (5). This results in a shared sparse coefficient that provides the optimal joint reconstruction of the source image and the current synthesized target medical image.

At step, 412, an updated synthesized target medical image is generated based on the updated sparse coefficients using the trained target dictionary. In particular, for a current location in the synthesized target medical image, the image patch of the synthesized target medical image centered at that location is reconstructed from the updated shared sparse coefficient for that image patch using the trained target dictionary, as shown in Equation (4). The pixel value of the center pixel in the reconstructed image patch is then assigned to the current location in the synthesized target medical image, as shown in Equation (5). An entire updated synthesized target medical image is generated by performing these operations for all locations in the synthesized target medical image in order to assign an updated pixel value to each pixel in the synthesized target medical image.

At step 414, it is determined if the synthesized target medical image has converged. For example, a difference value can be calculated between the pixel values of the current synthesized target medical image target medical image to the pixel values of the synthesized target medical image generated in a previous iteration, and if the difference value is less than a predetermined threshold, it can be determined that the synthesized target medical image has converged. Alternatively, it may be determined that the synthesized target medical image has converged when a predetermined maximum number of iterations is reached.

If it is determined that the synthesized target medical image has not converged, the method returns to step 410 and repeats the steps of updating the shared sparse coefficients (step 410) and generating an updated synthesized target medical image (step 412). Accordingly, the synthesized target medical image is iteratively updated by finding the shared sparse coefficients that provide the best joint reconstruction of the corresponding image patches or the source medical image and the current synthesized target medical image at each iteration. According to an advantageous embodiment, the weighting coefficient β (which is set to zero in step 406) can be increased gradually at each iteration of step 410, such that the reconstruction of the sparse representation of the synthesized target medical image is weighted more heavily with respect to the sparse representation of the source medical image at each iteration. If it is determined that the synthesized target medical image has converged, the method proceeds to step 416.

At step 416, the synthesized target medical image is output. For example, the synthesized target medical image can be displayed on a display of a computer system and/or stored in a storage or memory of a computer system.

In a possible embodiment, the method of FIG. 4 can be repeated for each of a plurality of medical images of a first type stored in database in order to generate a corresponding plurality of synthesized medical images of a second type, which can be then be stored in a database. The synthesized medical images of the second type can than be used as training data in a machine learning algorithm. For example, the synthesized medical images of the second type can be used as training data to train a machine learning based classifier for anatomical object detection, segmentation, tracking, or classifying.

In the method of FIG. 4, image patches centered at each pixel of a source medical image are extracted, and corresponding image patches centered at each pixel of a synthesized target medical image are reconstructed based on the shared sparse coefficients and used to assign a pixel value to each pixel. It is also possible that, image patches can be sampled from only a subset of pixels in the source image, with corresponding image patches centered at a subset of pixels in the synthesized target medical image used to assign pixel values to the synthesized target medical image. For example, in one possible alternative implementation, non-overlapping image patches covering the source medical image may be cropped from the source medical image. In this case, corresponding non-overlapping image patches of the synthesized target medical image may be reconstructed based on the calculated shared sparse coefficients, and each of the reconstructed non-overlapping image patches can be used in its entirety as a respective portion of the synthesized target medical image.

Figure 5:
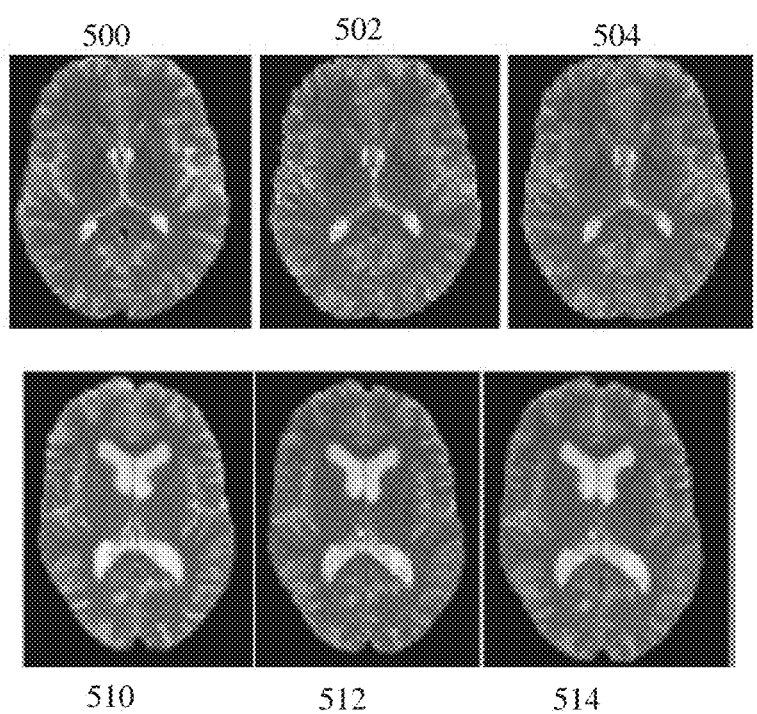
FIG. 5 illustrates exemplary results for image synthesis using the method of FIG. 4.

FIG. 5 illustrates exemplary results for image synthesis using the method of FIG. 4. As shown in FIG. 5 image 500 is a first ground truth T2 MR image, image 502 is a corresponding synthesized T2 MR image generated from an input T1 MR image using the modality propagation method of FIG. 4 with one iteration, and image 504 is a synthesized T2 MR image generated from the input T2 MR image using the modality propagation method of FIG. 4 with two iterations. Image 510 is a second ground truth T2 MR image, image 512 is a corresponding synthesized T2 MR image generated from an input T1 MR image using the modality propagation method of FIG. 4 with one iteration, and image 514 is a synthesized T2 MR image generated from the input T1 MR image using the modality propagation method of FIG. 4 with two iterations.

Figure 6:
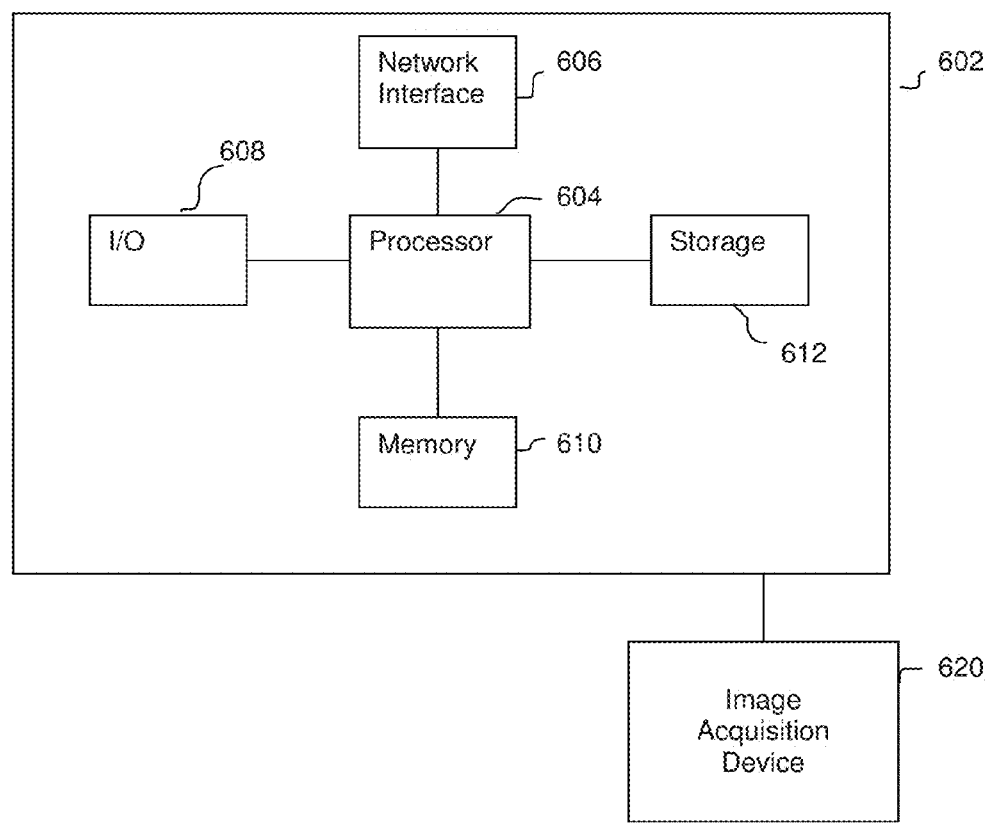
FIG. 6 is a high-level block diagram of a computer capable of implementing the present invention.

The above-described method for medical image synthesis may be implemented on a computer using well-known computer processors, memory units, storage devices, computer software, and other components. A high-level block diagram of such a computer is illustrated in FIG. 6. Computer 602 contains a processor 604, which controls the overall operation of the computer 602 by executing computer program instructions which define such operation. The computer program instructions may be stored in a storage device 612 (e.g., magnetic disk) and loaded into memory 610 when execution of the computer program instructions is desired. Thus, the steps of the methods of FIGS. 3 and 4 may be defined by the computer program instructions stored in the memory 610 and/or storage 612 and controlled by the processor 604 executing the computer program instructions. An image acquisition device 620, such as an MR scanning device or a CT scanning device, can be connected to the computer 602 to input image data to the computer 602. It is possible to implement the image acquisition device 620 and the computer 602 as one device. It is also possible that the image acquisition device 620 and the computer 602 communicate wirelessly through a network. In a possible embodiment, the computer 602 can be located remotely with respect to the image acquisition device 620 and the method steps described herein can be performed as part of a server or cloud based service. The computer 602 also includes one or more network interfaces 606 for communicating with other devices via a network. The computer 602 also includes other input/output devices 608 that enable user interaction with the computer 602 (e.g., display, keyboard, mouse, speakers, buttons, etc.). Such input/output devices 608 may be used in conjunction with a set of computer programs as an annotation tool to annotate volumes received from the image acquisition device 620. One skilled in the art will recognize that an implementation of an actual computer could contain other components as well, and that FIG. 6 is a high level representation of some of the components of such a computer for illustrative purposes.

The foregoing Detailed Description is to be understood as being in every respect illustrative and exemplary, but not restrictive, and the scope of the invention disclosed herein is not to be determined from the Detailed Description, but rather from the claims as interpreted according to the full breadth permitted by the patent laws. It is to be understood that the embodiments shown and described herein are only illustrative of the principles of the present invention and that various modifications may be implemented by those skilled in the art without departing from the scope and spirit of the invention. Those skilled in the art could implement various other feature combinations without departing from the scope and spirit of the invention.

The invention claimed is:

1. A method for synthesizing a target medical image from a source medical image comprising:
   cropping a plurality of image patches from the source medical image; and
   generating a synthesized target medical image from the source medical image by jointly performing sparse coding between each image patch of the source medical image and a corresponding image patch of the synthesized target image based on jointly trained source and target dictionaries, wherein generating a synthesized target medical image from the source medical image by jointly performing sparse coding between each image patch of the source medical image and a corresponding image patch of the synthesized target image based on jointly trained source and target dictionaries comprises:
   for each of the plurality of image patches of the source medical image:
      calculating a shared sparse coefficient for the image patch of the source medical image and the corresponding image patch of the target synthesize medical image that results in an optimal joint reconstruction of the image patch of the source medical image and the corresponding image patch of the synthesized target medical image using the jointly trained source and target dictionaries;
      reconstructing the corresponding image patch of the synthesized target medical image based on the shared sparse coefficient using the trained target dictionary; and
      assigning a pixel value of a center pixel in the reconstructed corresponding image patch of the synthesized target medical image to a pixel in the synthesized target medical image at which the corresponding image patch of the synthesized target medical image is centered.

2. The method of claim 1, wherein generating a synthesized target medical image from the source medical image by jointly performing sparse coding between each image patch of the source medical image and a corresponding patch of the synthesized target image based on jointly trained source and target dictionaries comprises:
   calculating, for each of the plurality of image patches of the source medical image, a shared sparse coefficient for that image patch and the corresponding image patch of the synthesized target medical image based on the trained source dictionary and the image patch in the source medical image;
   generating an initial synthesized target medical image based on the calculated shared sparse coefficients using the trained target dictionary;
   updating the shared sparse coefficient for each image patch of the source medical image and each corresponding image patch of the synthesized target medical image based on the image patch in the source medical image, the corresponding image patch in the synthesized target medical image, and the trained source and target dictionaries; and
   generating an updated synthesized target medical image based on the updated shared sparse coefficients using the trained target dictionary.

3. The method of claim 2, wherein generating a synthesized target medical image from the source medical image by jointly performing sparse coding between each image patch of the source medical image and a corresponding patch of the synthesized target image based on jointly trained source and target dictionaries further comprises:
   repeating the steps of updating the shared sparse coefficient for each image patch of the source medical image and each corresponding image patch of the synthesized target medical image and generating an updated synthesized target medical image for a plurality of iterations.

4. The method of claim 2, wherein generating a synthesized target medical image from the source medical image by jointly performing sparse coding between each image patch of the source medical image and a corresponding patch of the synthesized target image based on jointly trained source and target dictionaries further comprises:
   repeating the steps of updating the shared sparse coefficient for each image patch of the source medical image and each corresponding image patch of the synthesized target medical image and generating an updated synthesized target medical image until the updated synthesized target medical image converges.

5. The method of claim 2, wherein calculating, for each of the plurality of image patches of the source medical image, a shared sparse coefficient for that image patch and the corresponding image patch of the synthesized target medical image based on the trained source dictionary and the image patch in the source medical image comprises:
   calculating, for each of the plurality of image patches of the source medical image, a shared sparse coefficient for that image patch and the corresponding image patch of the synthesized target medical image that provides an optimal reconstruction of that image patch in the source medical image using the trained source dictionary.

6. The method of claim 5, wherein calculating, for each of the plurality of image patches of the source medical image, a shared sparse coefficient for that image patch and the corresponding image patch of the synthesized target medical image that provides an optimal reconstruction of that image patch in the source medical image using the trained source dictionary comprises:
   calculating the shared sparse coefficient $\hat{\gamma}$ for each image patch as $$\hat{\gamma} = \underset{\gamma}{\mathrm{argmin}} \|P_x^S - D_s\gamma\|_F^2, \text{ s.t. } \|\gamma\|_0 \leq C,$$

where $P_x^S$ is an image patch centered a position x in the source medical image, $D_s$ is the trained source dictionary, and C is a constant that determines the maximum number of non-zero elements $\|\gamma\|_0$ in the sparse coefficient.

7. The method of claim 2, wherein generating an initial synthesized target medical image based on the calculated shared sparse coefficients using the trained target dictionary comprises:
for each of the plurality of image patches in the source medical image, reconstructing the corresponding image patch of the synthesized target medical image based on the calculated shared sparse coefficient using the trained target dictionary; and
assigning a pixel value of a center pixel of the reconstructed corresponding image patch of the synthesized target medical image to a pixel in the synthesized target medical image at which the reconstructed corresponding image patch of the synthesized target medical image is centered.

8. The method of claim 2, wherein updating the shared sparse coefficient for each image patch of the source medical image and each corresponding image patch of the synthesized target medical image based on the image patch in the source medical image, the corresponding image patch in the synthesized target medical image, and the trained source and target dictionaries comprises:
calculating, for each of the plurality of image patches in the source medical image, an updated shared sparse coefficient for that image patch and the corresponding image patch of the synthesized target medical image that results in an optimal joint reconstruction of that image patch of the source medical image and the corresponding image patch of the synthesized target medical image using the jointly trained source and target dictionaries.

9. The method of claim 8, wherein calculating, for each of the plurality of image patches in the source medical image, an updated shared sparse coefficient for that image patch and the corresponding image patch of the synthesized target medical image that results in an optimal joint reconstruction of that image patch of the source medical image and the corresponding image patch of the synthesized target medical image using the jointly trained source and target dictionaries comprises:
calculating the shared sparse coefficient $\hat{\gamma}$ for each image patch as $$\hat{\gamma} = \underset{\gamma}{\mathrm{argmin}} \|P_x^S - D_s\gamma\|_F^2 + \beta\|P_x^T - D_t\gamma\|_F^2, \text{ s.t. } \|\gamma\|_0 \leq C,$$

where $P_x^S$ is an image patch centered a position x in the source medical image, $P_x^T$ is the corresponding image patch centered at the position x in the synthesized target medical image, $D_s$ is the trained source dictionary, $D_t$ is the trained target dictionary, $\beta$ is a weighting coefficient, and C is a constant that determines the maximum number of non-zero elements $\|\gamma\|_0$ in the sparse coefficient.

10. The method of claim 9, wherein generating a synthesized target medical image from the source medical image by jointly performing sparse coding between each image patch of the source medical image and a corresponding patch of the synthesized target image based on jointly trained source and target dictionaries further comprises:
repeating the steps of updating the shared sparse coefficient for each image patch of the source medical image and each corresponding image patch of the synthesized target medical image and generating an updated synthesized target medical image for a plurality of iterations, wherein the weighting coefficient $\beta$ is increased with each iteration.

11. The method of claim 2, wherein generating an updated synthesized target medical image based on the updated shared sparse coefficients using the trained target dictionary comprises:
for each of the plurality of image patches in the source medical image, reconstructing the corresponding image patch of the synthesized target medical image based on the updated shared sparse coefficient using the trained target dictionary; and
assigning a pixel value of a center pixel of the reconstructed corresponding image patch of the synthesized target medical image to a pixel in the synthesized target medical image at which the reconstructed corresponding image patch of the synthesized target medical image is centered.

12. The method of claim 1, wherein the trained source and target dictionaries are jointly trained to learn an implicit transformation between training image patches in a source domain and corresponding image patches in a target domain.

13. The method of claim 1, wherein the trained source and target dictionaries are jointly trained to optimize an optimization problem $$\underset{D_s, D_t, \Gamma}{\min} \|P_s - D_s\Gamma\|_F^2 + \beta\|P_t - D_t\Gamma\|_F^2,$$

$$\text{s.t. } \|\Gamma_j\|_0 \leq C, \forall j \in \{1, \ldots, N\},$$

where $P_s$ is a training set of image patches in a source domain, $P_t$ is the training set of image patches in a target domain, $D_s$ is the source dictionary, $D_t$ is the target dictionary, T is the set of sparse coefficients corresponding to N training samples in $P_s$ and $P_t$, $\beta$ is a weighting coefficient, and C is a constant that determines a maximum number of non-zero elements $\|\Gamma_j\|_0$ in each sparse coefficient.

14. The method of claim 13, wherein the trained source and target dictionaries are jointly trained to optimize the optimization problem using one of a K-SVD dictionary learning algorithm or method of orthogonal direction (MOD) dictionary learning algorithm.

15. The method of claim 1, wherein the source medical image is a medical image of a first imaging modality and the synthesized target medical image is a synthesized medical image of second imaging modality.

16. The method of claim 1, wherein the source medical image is a T1-weighted magnetic resonance (MR) image and the synthesized target medical image is a synthesized T2-weighted MR image.

17. The method of claim 1, wherein the source medical image is a non-contrast computed tomography (CT) image and the synthesized target medical image is a synthesized contrast CT image.

18. The method of claim 1, wherein the source medical image is a low-kV computed tomography (CT) image and the synthesized target medical image is a synthesized high-kV CT image.

19. The method of claim 1, wherein the source medical image is a low-resolution medical image and the synthesized target medical image is synthesized up-sampled high-resolution medical image of a same imaging modality as the source medical image.

20. The method of claim 1, further comprising:
repeating the steps of cropping a plurality of image patches from the source medical image and generating a synthesized target medical image from the source medical image for a plurality of source medical images, resulting in a plurality of synthesized target medical images; and
training a machine learning based classifier using the plurality of synthesized target medical images as training data.

21. An apparatus for synthesizing a target medical image from a source medical image comprising:
means for cropping a plurality of image patches from the source medical image; and
means for generating a synthesized target medical image from the source medical image by jointly performing sparse coding between each image patch of the source medical image and a corresponding image patch of the synthesized target image based on jointly trained source and target dictionaries, wherein the means for generating a synthesized target medical image from the source medical image by jointly performing sparse coding between each image patch of the source medical image and a corresponding image patch of the synthesized target image based on jointly trained source and target dictionaries comprises:
means for calculating a shared sparse coefficient for each image patch of the source medical image and the corresponding image patch of the target synthesize medical image that results in an optimal joint reconstruction of the image patch of the source medical image and the corresponding image patch of the synthesized target medical image using the jointly trained source and target dictionaries;
means for reconstructing each corresponding image patch of the synthesized target medical image based on the shared sparse coefficient using the trained target dictionary; and
means for assigning a pixel value of a center pixel in each reconstructed corresponding image patch of the synthesized target medical image to a pixel in the synthesized target medical image at which the corresponding image patch of the synthesized target medical image is centered.

22. The apparatus of claim 21, wherein the means for generating a synthesized target medical image from the source medical image by jointly performing sparse coding between each image patch of the source medical image and a corresponding patch of the synthesized target image based on jointly trained source and target dictionaries comprises:
means for calculating, for each of the plurality of image patches of the source medical image, a shared sparse coefficient for that image patch and the corresponding image patch of the synthesized target medical image based on the trained source dictionary and the image patch in the source medical image;
means for generating an initial synthesized target medical image based on the calculated shared sparse coefficients using the trained target dictionary;
means for updating the shared sparse coefficient for each image patch of the source medical image and each corresponding image patch of the synthesized target medical image based on the image patch in the source medical image, the corresponding image patch in the synthesized target medical image, and the trained source and target dictionaries; and
means for generating an updated synthesized target medical image based on the updated shared sparse coefficients using the trained target dictionary.

23. The apparatus of claim 22, wherein the means for calculating, for each of the plurality of image patches of the source medical image, a shared sparse coefficient for that image patch and the corresponding image patch of the synthesized target medical image based on the trained source dictionary and the image patch in the source medical image comprises:
means for calculating, for each of the plurality of image patches of the source medical image, a shared sparse coefficient for that image patch and the corresponding image patch of the synthesized target medical image that provides an optimal reconstruction of that image patch in the source medical image using the trained source dictionary.

24. The apparatus of claim 22, wherein the means for updating the shared sparse coefficient for each image patch of the source medical image and each corresponding image patch of the synthesized target medical image based on the image patch in the source medical image, the corresponding image patch in the synthesized target medical image, and the trained source and target dictionaries comprises:
means for calculating, for each of the plurality of image patches in the source medical image, an updated shared sparse coefficient for that image patch and the corresponding image patch of the synthesized target medical image that results in an optimal joint reconstruction of that image patch of the source medical image and the corresponding image patch of the synthesized target medical image using the jointly trained source and target dictionaries.

25. The apparatus of claim 21, wherein the trained source and target dictionaries are jointly trained to learn an implicit transformation between training image patches in a source domain and corresponding image patches in a target domain.

26. A non-transitory computer readable medium storing computer program instructions for synthesizing a target medical image from a source medical image, the computer program instructions when executed by a processor cause the processor to perform operations comprising:
cropping a plurality of image patches from the source medical image; and
generating a synthesized target medical image from the source medical image by jointly performing sparse coding between each image patch of the source medical image and a corresponding image patch of the synthesized target image based on jointly trained source and target dictionaries, wherein generating a synthesized target medical image from the source medical image by jointly performing sparse coding between each image patch of the source medical image and a corresponding image patch of the synthesized target image based on jointly trained source and target dictionaries comprises:
for each of the plurality of image patches of the source medical image:

calculating a shared sparse coefficient for the image patch of the source medical image and the corresponding image patch of the target synthesize medical image that results in an optimal joint reconstruction of the image patch of the source medical image and the corresponding image patch of the synthesized target medical image using the jointly trained source and target dictionaries;

reconstructing the corresponding image patch of the synthesized target medical image based on the shared sparse coefficient using the trained target dictionary; and assigning a pixel value of a center pixel in the reconstructed corresponding image patch of the synthesized target medical image to a pixel in the synthesized target medical image at which the corresponding image patch of the synthesized target medical image is centered.

27. The non-transitory computer readable medium of claim 26, wherein generating a synthesized target medical image from the source medical image by jointly performing sparse coding between each image patch of the source medical image and a corresponding patch of the synthesized target image based on jointly trained source and target dictionaries comprises:

calculating, for each of the plurality of image patches of the source medical image, a shared sparse coefficient for that image patch and the corresponding image patch of the synthesized target medical image based on the trained source dictionary and the image patch in the source medical image;

generating an initial synthesized target medical image based on the calculated shared sparse coefficients using the trained target dictionary;

updating the shared sparse coefficient for each image patch of the source medical image and each corresponding image patch of the synthesized target medical image based on the image patch in the source medical image, the corresponding image patch in the synthesized target medical image, and the trained source and target dictionaries; and generating an updated synthesized target medical image based on the updated shared sparse coefficients using the trained target dictionary.

28. The non-transitory computer readable medium of claim 27, wherein generating a synthesized target medical image from the source medical image by jointly performing sparse coding between each image patch of the source medical image and a corresponding patch of the synthesized target image based on jointly trained source and target dictionaries further comprises:

repeating the operations of updating the shared sparse coefficient for each image patch of the source medical image and each corresponding image patch of the synthesized target medical image and generating an updated synthesized target medical image for a plurality of iterations.

29. The non-transitory computer readable medium of claim 27, wherein calculating, for each of the plurality of image patches of the source medical image, a shared sparse coefficient for that image patch and the corresponding image patch of the synthesized target medical image based on the trained source dictionary and the image patch in the source medical image comprises:

calculating, for each of the plurality of image patches of the source medical image, a shared sparse coefficient for that image patch and the corresponding image patch of the synthesized target medical image that provides an optimal reconstruction of that image patch in the source medical image using the trained source dictionary.

30. The non-transitory computer readable medium of claim 29, wherein calculating, for each of the plurality of image patches of the source medical image, a shared sparse coefficient for that image patch and the corresponding image patch of the synthesized target medical image that provides an optimal reconstruction of that image patch in the source medical image using the trained source dictionary comprises:

calculating the shared sparse coefficient $\hat{\gamma}$ for each image patch as $$\hat{\gamma} = \underset{\gamma}{\operatorname{argmin}} \|P_x^S - D_s\gamma\|_F^2, \text{ s.t. } \|\gamma\|_0 \leq C,$$

where $P_x^S$ is an image patch centered a position x in the source medical image, $D_s$ is the trained source dictionary, and C is a constant that determines the maximum number of non-zero elements $\|\gamma\|_0$ in the sparse coefficient.

31. The non-transitory computer readable medium of claim 27, wherein generating an initial synthesized target medical image based on the calculated shared sparse coefficients using the trained target dictionary comprises:

for each of the plurality of image patches in the source medical image, reconstructing the corresponding image patch of the synthesized target medical image based on the calculated shared sparse coefficient using the trained target dictionary; and assigning a pixel value of a center pixel of the reconstructed corresponding image patch of the synthesized target medical image to a pixel in the synthesized target medical image at which the reconstructed corresponding image patch of the synthesized target medical image is centered.

32. The non-transitory computer readable medium of claim 27, wherein updating the shared sparse coefficient for each image patch of the source medical image and each corresponding image patch of the synthesized target medical image based on the image patch in the source medical image, the corresponding image patch in the synthesized target medical image, and the trained source and target dictionaries comprises:

calculating, for each of the plurality of image patches in the source medical image, an updated shared sparse coefficient for that image patch and the corresponding image patch of the synthesized target medical image that results in an optimal joint reconstruction of that image patch of the source medical image and the corresponding image patch of the synthesized target medical image using the jointly trained source and target dictionaries.

33. The non-transitory computer readable medium of claim 32, wherein calculating, for each of the plurality of image patches in the source medical image, an updated shared sparse coefficient for that image patch and the corresponding image patch of the synthesized target medical image that results in an optimal joint reconstruction of that image patch of the source medical image and the corresponding image patch of the synthesized target medical image using the jointly trained source and target dictionaries comprises:

calculating the shared sparse coefficient $\hat{\gamma}$ for each image patch as $$\hat{\gamma} = \underset{\gamma}{\operatorname{argmin}} \|P_x^S - D_s\gamma\|_F^2 + \beta\|P_x^T - D_t\gamma\|_F^2, \text{ s.t. } \|\gamma\|_0 \leq C,$$

where $P_x^S$ is an image patch centered a position x in the source medical image, $P_x^T$ is the corresponding image patch centered at the position x in the synthesized target medical image, $D_s$ is the trained source dictionary, $D_t$ is the trained target dictionary, $\beta$ is a weighting coefficient, and C is a constant that determines the maximum number of non-zero elements $\|\gamma\|_0$ in the sparse coefficient.

34. The non-transitory computer readable medium of claim 33, wherein generating a synthesized target medical image from the source medical image by jointly performing sparse coding between each image patch of the source medical image and a corresponding patch of the synthesized target image based on jointly trained source and target dictionaries further comprises:
repeating the operations of updating the shared sparse coefficient for each image patch of the source medical image and each corresponding image patch of the synthesized target medical image and generating an updated synthesized target medical image for a plurality of iterations, wherein the weighting coefficient $\beta$ is increased with each iteration.

35. The non-transitory computer readable medium of claim 27, wherein generating an updated synthesized target medical image based on the updated shared sparse coefficients using the trained target dictionary comprises:
for each of the plurality of image patches in the source medical image, reconstructing the corresponding image patch of the synthesized target medical image based on the updated shared sparse coefficient using the trained target dictionary; and
assigning a pixel value of a center pixel of the reconstructed corresponding image patch of the synthesized target medical image to a pixel in the synthesized target medical image at which the reconstructed corresponding image patch of the synthesized target medical image is centered.

36. The non-transitory computer readable medium of claim 26, wherein the trained source and target dictionaries are jointly trained to learn an implicit transformation between training image patches in a source domain and corresponding image patches in a target domain.

37. The non-transitory computer readable medium of claim 26, wherein the trained source and target dictionaries are jointly trained to optimize an optimization problem $$\underset{D_s, D_t, \Gamma}{\min} \|P_s - D_s\Gamma\|_F^2 + \beta\|P_t - D_t\Gamma\|_F^2,$$

$$\text{s.t. } \|\Gamma_j\|_0 \leq C, \forall j \in \{1, \ldots, N\},$$

where $P_s$ is a training set of image patches in a source domain, $P_t$ is the training set of image patches in a target domain, $D_s$ is the source dictionary, $D_t$ is the target dictionary, $\Gamma$ is the set of sparse coefficients corresponding to N training samples in $P_s$ and $P_t$, $\beta$ is a weighting coefficient, and C is a constant that determines a maximum number of non-zero elements $\|\Gamma_j\|_0$ in each sparse coefficient.

* * * * *